US006975084B2

(12) United States Patent

Sugiura et al.

(10) Patent No.: US 6,975,084 B2

(45) Date of Patent: Dec. 13, 2005

(54) POWER WINDOW CONTROLLER

(75) Inventors: Toshihiko Sugiura, Utsunomiya (JP); Akihiko Hirata, Kasugai (JP); Tomoaki Tanaka, Iwata (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/776,384

(22) Filed: Feb. 10, 2004

(65) Prior Publication Data

US 2004/0160202 A1 Aug. 19, 2004

(30) Foreign Application Priority Data

Feb. 12, 2003 (JP) ....................................... 2003-034003

(51) Int. Cl.[7] ................................................. H02P 7/00

(52) U.S. Cl. ....................... 318/283; 318/265; 318/266; 318/446; 307/10.1; 191/3; 370/498; 180/281

(58) Field of Search ................................ 318/283–288, 318/254–266, 446–448; 307/9.1, 10.1, 112–113; 191/2, 3; 370/498; 180/281

(56) References Cited

U.S. PATENT DOCUMENTS 5,194,756 A * 3/1993 Darbesio ................... 307/10.2
5,547,208 A * 8/1996 Chappell et al. ............ 180/281
6,031,296 A * 2/2000 Takagi et al. .............. 307/10.1
6,049,139 A * 4/2000 Nagaura et al. ........... 307/10.1
6,060,794 A * 5/2000 Takagi et al. ............... 307/125
6,072,290 A * 6/2000 Takagi et al. ............... 318/283
6,081,085 A * 6/2000 Ohashi et al. ............. 318/283
6,111,373 A * 8/2000 Ohashi ....................... 318/265
6,157,091 A * 12/2000 Yoshida et al. ............ 307/10.1
6,288,506 B1 * 9/2001 Hiwatari ..................... 318/283
6,469,404 B1 * 10/2002 Pohjola ..................... 307/10.1
6,744,147 B2 * 6/2004 Taniguchi et al. ......... 307/10.1
6,769,521 B2 * 8/2004 Saito et al. ..................... 191/2
2001/0028241 A1 * 10/2001 Saito et al. ................. 323/282
2001/0054847 A1 * 12/2001 Yoshida et al. ............ 307/10.1
2002/0043964 A1 * 4/2002 Saito et al. ................. 323/282
2003/0001434 A1 * 1/2003 Saito et al. ................ 307/10.1
2003/0098211 A1 * 5/2003 Saito et al. ..................... 191/3

* cited by examiner

*Primary Examiner*—Paul Ip

(74) *Attorney, Agent, or Firm*—Beyer Weaver & Thomas LLP

(57) ABSTRACT

A controller has a plurality of control units that are mutually connected by a communication line and are set at different places of an automobile, each corresponding to a different one of its power windows and serving to control its opening and closing. One of these control units is adapted to transmit a signal, in response to a switch operation, to another of the control units through the communication line to open or close the window corresponding to the latter control unit. When this control unit detects that it has submerged in water, it applies a constant voltage to an interface of the communication line. This prevents communications through the communication line and windows from moving in an unwanted manner.

9 Claims, 6 Drawing Sheets

POWER WINDOW CONTROLLER

BACKGROUND OF THE INVENTION

This invention relates to a controller for a mobile structure such as a power window of an automobile that can be opened and closed and more particularly to such a controller that can reliably prevent such a structure from operating erroneously when, for example, the automobile has fallen into a body of water and the controller is in an underwater condition.

In general, power window systems for an automobile are electronically controlled and provided with a function of automatically reversing the window motion for preventing an object such as a person's had from becoming caught by the closing window. Control units of the type adapted to control the source power supplied to a motor serving as the actuator of a window to control its motion are commonly each provided to a seat of the automobile, each comprising a motor-driving circuit with relays for rotating the motor in two directions and a control circuit including a microcomputer for controlling these relays in response to the user's switch operations. A function for making communications among the control units may be provided such that a specified one of the control units at one of the seats such as the driver seat can control the opening and closing of all of the windows including the windows at the other seats. In other words, communication lines may connect the control units for different windows such that the driver may be able to operate a knob on his/her controller unit on the elbow rest on the door on his/her side such that signals can be transmitted to the other control units to open and close windows corresponding to the other seats such as the passenger seat or a back seat. Such control units are sometimes called an operation unit because operation switches to be operated by the user are usually integrally incorporated.

From the point of view of safety, it is important for such power window systems to function reliably even when the automobile has sunk into a body of water such that the system will not operate incorrectly because of a leak current due to the presence of water or an error in the microcomputer and also that it will not become impossible to open the windows from inside.

Japanese Patent Publication Tokkai 2000-179234 describes an operation unit provided with a detecting circuit for detecting an underwater condition adapted to switch on both relays of the motor-driving circuit of this operation unit if an underwater condition is detected thereby such that both terminals of the motor come to be at a same potential and the motor is prevented from moving in an unwanted direction. Its circuits are further so structured that if the user attempts to open a window, say, by manually operating a switch while an underwater condition is being detected by the detecting circuit, both terminals of the coil of the relay for closing the window will come to be at a same potential such that the motor will turn in the direction of opening the window.

Japanese Patent Publication Tokkai 2000-179234 describes two types of systems with control units at different seats connected with a bus line for multiplex communications provided with measures to be taken under an underwater condition. Systems of one of these types may be characterized as having the operating units of different seats connected by a signal communicating line separate from the aforementioned bus line and a detecting circuit for an underwater condition incorporated into one or all of the operation units such that if any of the detecting circuits detects an underwater condition, the detection circuit which detected the underwater condition outputs a detection signal to each relay of the other operation units through the signal line, thereby providing a voltage similar to the source voltage to forcibly switch on each relay of each operation unit.

Systems of this type are disadvantageous because a separate signal line is required for the application of voltage for driving the relays besides the bus line for communications among the units. Thus, the wiring becomes complicated and the production cost of the vehicle to which the system is mounted is increased.

Systems of the other type may be characterized as having a detection circuit incorporated in the operating unit at one or all of the seats such that if any of them detects an underwater condition, the operating unit incorporating the detection circuit that detected the underwater condition transmits a detection signal to the other operating units and that the control circuit of each operating unit that receives this detection signal forcibly switches on each relay within that operating unit. With a system thus structured, if any of the seats is immersed in water, erroneous operations of the windows at all seats due to the underwater condition can be prevented.

Systems of this type also have problems. Firstly, signal waveforms of the multiplex communications are likely to be disturbed by electric leaks and attachment of a conductive object to the connector terminals on the boards of the operation units under water and this may inhibit transmission of correct detection signals. Secondly, such electric leaks and attachment of a conductive object may cause an overcurrent through the CPU of the microcomputer of the control circuit. If the CPU is thereby damaged and fails to function properly, it is again likely that the detection will not be transmitted correctly. If the operating unit of a seat such as the driver's seat has gone under water, a detection signal may be transmitted from this operating unit due to a current leakage into the bus line and the windows by the other seats corresponding to operating units not yet under water may start to open or close erroneously in response to such a signal.

SUMMARY OF THE INVENTION

It is therefore an object of this invention in view of such problems with prior art power window control systems to provide a controller for power windows adapted to carry out communications by making connections among control units without having any signal lines provided in addition to the communication lines so as to be capable of reliably preventing erroneous operations of the windows when the controller has sunk under water.

A controller embodying this invention is comprised of a plurality of control units and a communication line that has an interface and is connected to these control units for allowing communications among them. The control units are set at different places of a vehicle such as an automobile or a small airplane, each corresponding to and serving to control the opening and closing of a mobile structure such as a power window at the seat of a user, a sunroof or a sliding door. A specified one of these control units, usually the one at the driver seat in the case of an automobile, is adapted to transmit an operating signal, in response to a switch operation thereon, to another of the control units through the communication line to make the structure corresponding to the latter control unit operable. At least this specified one of the control units is structured so as to have the following two functions that are herein referred to as the "detector function" and the "communication preventing function." The detection function is a function for detecting a so-called underwater condition which means the condition of being submerged in water, for example, when the automobile has fallen into water. The communication preventing function is a function of applying a constant voltage to the interface of the communication line and thereby preventing communications therethrough if an underwater condition is detected by the detector function. In the description of the invention that follows, the "mobile structure" referred to above will be assumed to be a power window of an automobile, for the sake of convenience.

In the above, the control unit may be an operation unit without including the function of actually driving the corresponding structure. If the mobile structure is a sliding door for a back seat of an automobile and if a control unit for actually opening and closing this sliding door is at the back seat, the control unit at the driver seat which sends command signals to the control unit at the back seat to control the motion of the sliding door is also referred to as a control unit although it may not contain any means for actually opening or closing the sliding door.

What is herein referred to as the specified control unit is basically a unit which transmits a signal through the communication line to cause another control unit to control the motion of the structure such as a window corresponding to the latter. In theory, all of the control units of a controller may be of this type. The aforementioned two functions may be provided also to a control unit other than the "specified control unit."

If the specified control unit sinks into water and this underwater condition is detected by its detector function, a constant voltage is applied to the interface of the communication line by its communication preventing function so as to disable the communication line, that is, to prevent communications through the communication line. Thus, at least the transmission of any signal from the specified control unit to another unit is prevented and this means that although an incorrect signal may be generated by the specified control unit because of the underwater condition, such an incorrect signal will not be communicated to any of the other units.

In the above, the constant voltage to be applied may be the positive power source voltage of the car battery or the ground voltage. The interface may comprise a switching element for switching between a higher voltage and a lower voltage such that a selected constant voltage can be applied to the drive line of the switching element. The interface may alternatively comprise a communication IC such that the constant voltage may be applied to its transmission port.

Throughout herein, like components are indicated by the same symbol even where they are components of controllers according to different embodiments of the invention and may not necessarily be described repetitiously for the convenience of description.

DETAILED DESCRIPTION OF THE INVENTION

Figure 1:
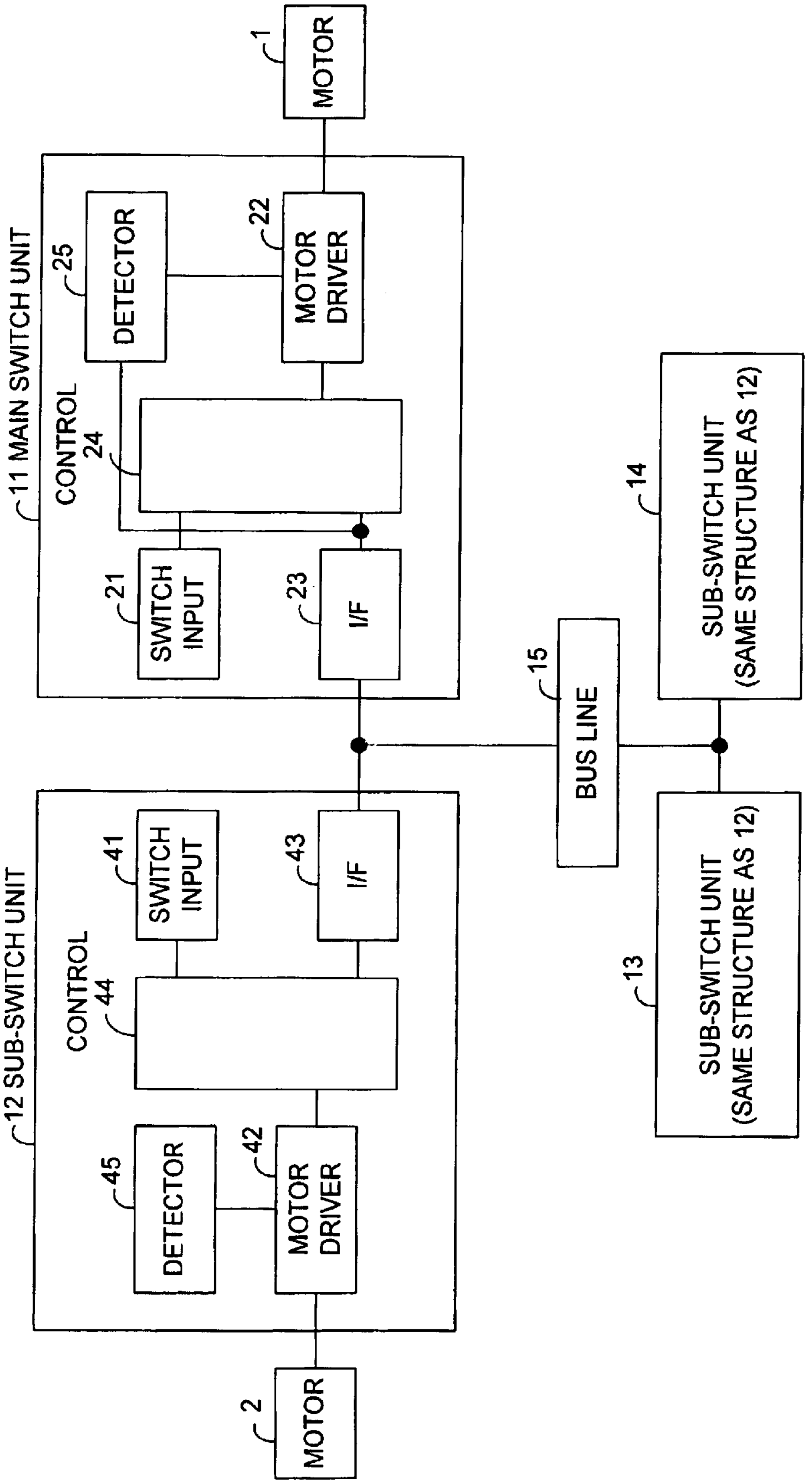
FIG. 1 is a block diagram of a controller embodying this invention.

The invention is described next by way of examples of a power window controller for an automobile. As shown in FIG. 1, a controller according to this invention is comprised of a main switch unit 11 which is a control unit at the driver's seat, three sub-switch units 12, 13 and 14 which are control units at the passenger seat and the back seats on the left-hand and right-hand sides, and a multiplex communication bus line 15 ("communication line") connecting these units together. Numerals 1 and 2 in FIG. 1 respectively indicate a motor for driving (opening and closing) the window at the driver seat and the passenger seat. Numeral 3 in FIGS. 2 and 3 indicates the power source (battery) of the automobile. The sub-switch units 13 and 14 for the back seats are structured similarly to the sub-switch unit 12 for the passenger seat.

The main switch unit 11 at the driver's seat is provided with a switch input circuit 21, a motor driver circuit 22, a multiplex communication interface 23, a control circuit 24 and a detector circuit 25 for an underwater condition.

Figure 2:
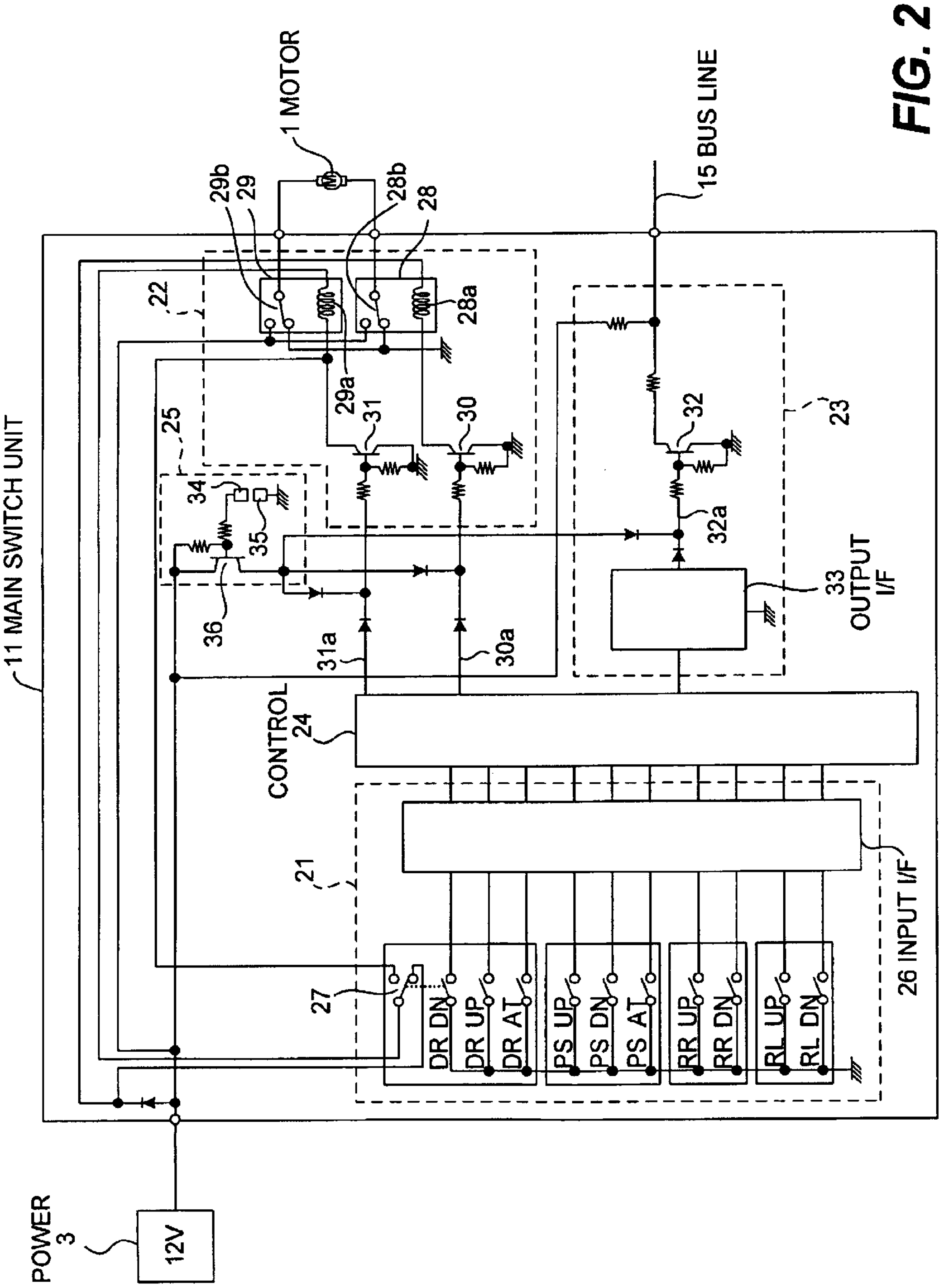
FIG. 2 is a circuit diagram of a main switch unit according to a first embodiment of the invention.

As shown in FIG. 2, the switch input circuit 21 is provided with many operating switches DRDN, DRUP, DRAT, PSUP, PSDN, ASAT, RRUP, RRDN, RLUP and RLDN to be operated by the driver, a switch input interface (INPUT I/F) 26 for converting signals (terminal voltages) from these operating switches into a specified form and transmitting to the control circuit 24 and a relay switch 27. In the symbols for the operating switches, DR, PS, RR and RL indicate respectively the driver seat, the passenger seat, the right-hand back seat and the left-hand back seat, and DN, UP and AT indicate respectively the downward motion, the upward motion and the automatic operation. Thus, for example, symbol DRDN indicates a switch for moving down (opening) the window at the driver seat and symbol PSUP indicates a switch for moving up (closing) the window at the passenger seat.

Each of the four areas in FIG. 2 surrounded by broken lines indicates a switch group corresponding to one of the different seats. Each switch group is usually operated by a single knob (not shown), and the driver seat is usually provided with four such knobs. In the above, the automatic operation (AT) of a window means allowing the window to open or close completely without operating on the knob.

In the example shown in FIG. 2, the automatic operation is possible only from the driver seat and the passenger seat since switches for automatic operation are not provided at the back seats. The automatic operation switches DRAT and PSAT cannot be switched on alone but are intended to be operated upon together with one of the switches DRUP, DRDN, PSUP and PSDN. It is to be noted in FIG. 2 that each of these operating switches has a normally open terminal.

The relay switch 27 is comprised of a common terminal ("the C terminal"), a normally open (NO) terminal and a normally closed (NC) terminal. The C terminal is connected to the terminal on the side of the power source of the coil **29*a* of a relay 29 (to be described below). The NC terminal is connected to the positive terminal side of the power source 3 and the NO terminal is connected to the terminal on the side of the grounding of the relay coil 29*a*. As a knob is operated by the driver to open his/her own window, the relay 27** closes its NO terminal in correlation with the closing of the terminal of the switch DRDN.

The motor driver circuit 22 is comprised of window-opening and window-closing relays 28 and 29 for supplying power to the motor 1 to rotate it respectively in the positive and negative direction (for opening and closing the window, respectively) and driving transistors 30 and 31 for driving these relays 28 and 29 under the control of the control circuit 24. The relay 28 (29) is comprised of an excitation coil 28*a* (29*a*) and a junction part 28*b* (29*b*) with a C terminal, a NO terminal and a NC terminal. The NO terminals of these relays 28 and 29 are connected to the positive electrode side of the power source 3 and their NC terminals are grounded. The C terminal of the relay 28 is connected to the side of the coil of the motor 1 that will cause the motor 1 to rotate in the positive direction if connected to the power source 3. The C terminal of the relay 29 is connected to the side of the coil of the motor 1 that will cause the motor 1 to rotate in the negative direction if connected to the power source 3.

The multiplex communication interface 23 is comprised of a communication transistor 32 (a switching element) for switching the voltage of the multiplex communication bus line 15 between a higher voltage and a lower voltage and an output interface (OUTPUT I/F) 33 for outputting communication signals from the control circuit 24 (containing an operation signal to another seat) as the driving signal for the communication transistor 32 and thereby transmitting this communication signal to the bus line 15.

The control circuit 24 is comprised of a microcomputer including a CPU and is adapted to function as follows. If switch DRDN alone is switched on, the driving transistor 30 but not the driving transistor 31 and hence the relay 28 but not the relay 29 is switched on such that the motor 1 is rotated in the positive direction and the window at the driver seat is opened. If both switches DRDN and DRAT are switched on simultaneously, the window at the driver seat is similarly opened and this opening motion is continued automatically until the window becomes completely open even if these switches are returned to the OFF position in the meantime. If switch DRUP alone is switched on, the driver transistor 29 but not the driving transistor 30 and hence the relay 29 but not the relay 28 is switched on such that the motor 1 is rotated in the negative direction and the window at the driver seat is closed. If both switches DRUP and DRAT are switched on simultaneously, the window at the driver seat is similarly closed and this closing motion is continued automatically until the window becomes completely closed even if these switches are returned to the OFF position in the meantime.

If any of switches PSUP, PSDN, PSAT, RRUP, RRDN, RLUP and RLDN is switched on, a corresponding operation signal is transmitted to the multiplex communication bus line 15 through the multiplex communication interface 23. If switch PSUP alone is switched on, for example, an operation signal for closing the window at the passenger seat is transmitted. If both switches PSUP and PSAT are switched on, another operation signal for automatically closing the window at the passenger seat is transmitted.

The detector circuit 25 is comprised of pads 34 and 35 which are normally insulated from each other but become conductive if invading water causes the insulative resistance to become too low and a detector transistor 36 adapted to be switched on if it becomes conductive between the pads 34 and 35. The detector transistor 36 is for opening and closing the connection between the drive lines 30*a*, 31*a* and 32*a* respectively of the driving transistors 30 and 31 and the communication transistor 32 and the positive electrode side of the power source 3. When the detector transistor 36 is switched on, the constant source voltage comes to be applied to the drive lines 30*a*, 31*a* and 32*a* such that the transistors 30, 31 and 32 are switched on. The aforementioned detection function and communication preventing function may therefore be considered to be functions of the detector circuit 25.

As shown in FIG. 1, the sub-switch unit 12 for the passenger seat window is provided with a switch input circuit 41, a motor driver circuit 42, a multiplex communication interface 43, a control circuit 44 and a detector circuit 45 for an underwater condition. In the following, components of the sub-switch unit 12 which are similar or equivalent to those of the main switch unit 11 are indicated by the same numerals and may not necessarily be explained repetitiously.

Figure 3:
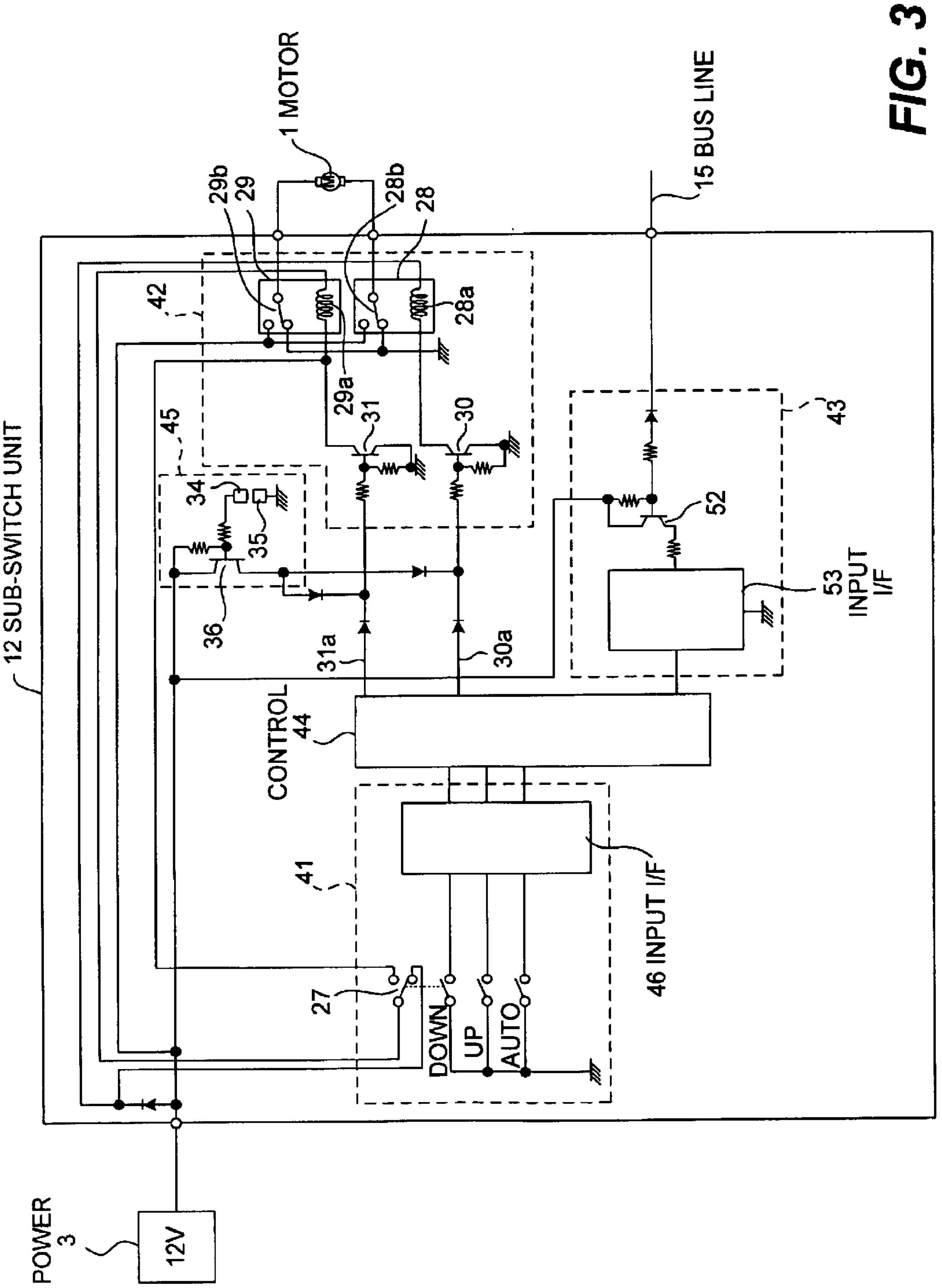
FIG. 3 is a circuit diagram of a sub-switch unit according to a first embodiment of the invention.

As shown more in detail in FIG. 3, the switch input circuit 41 is provided with operating switches DOWN, UP and AUTO to be operated by the user, a switch input interface (INPUT I/F) 46 for converting signals (terminal voltages) from these operating switches into a specified form and transmitting to the control circuit 44 and a relay switch 27. Of the above, the operating switches DOWN, UP and AUTO and the relay switch 27 are usually operated by way of a single knob (not shown) at the passenger seat. Operating switches DOWN, UP and AUTO are respectively for moving its own window (at the passenger seat) downward, upward and automatically (as explained above), each having a normally open terminal for inputting an operation signal.

The motor driver circuit 42 is of the same structure as the motor driver circuit 22 of the main switch unit 11.

The multiplex communication interface 43 is comprised of a communication transistor 52 adapted to be switched on and off according to the voltage level of the multiplex communication bus line 15 and an input interface (INPUT I/F) 53 for receiving operation signals on the bus line 15 through the operation of the communication transistor 52 and inputting them to the control circuit 44 in a specified form.

The control circuit 44 is comprised of a microcomputer including a CPU and is adapted to function as follows. If switch DOWN alone is switched on or an operation signal for moving down (opening) the corresponding window (the passenger seat window) is inputted through the multiplex communication interface 43, the control circuit 44 operates to switch on driving transistor 30 but not driving transistor 31 and hence the relay 28 but not the relay 29 such that the motor 2 is rotated in the positive direction and the window is opened. If both switches DOWN and AUTO are switched on simultaneously or an operation signal for opening the window automatically is inputted through the multiplex communication interface 43, the corresponding window is similarly opened and this opening motion is continued automatically until the window becomes completely open even if switch DOWN or AUTO or the operation signal is switched off in the meantime. If switch UP alone is switched on or an operation signal for moving up (closing) the corresponding window (the passenger seat window) is inputted through the multiplex communication interface 43, the control circuit 44 operates to switch on driving transistor 31 but not driving transistor 30 and hence the relay 29 but not the relay 28 such that the motor 2 is rotated in the negative direction and the window is closed. If both switches UP and AUTO are switched on simultaneously or an operation signal for closing the window automatically is inputted through the multiplex communication interface 43, the corresponding window is similarly closed and this closing motion is continued automatically until the window becomes completely closed even if switch UP or AUTO or the operation signal is switched off in the meantime.

The detector circuit 45 is structured similarly to the detector circuit 25 of the main switch unit 11 except that its detector transistor 36 is for opening and closing the connection between the drive lines 30*a* and 31*a* respectively of the driving transistors 30 and 31 and the positive electrode side of the power source 3. When this detector transistor 36 is switched on, the constant source voltage comes to be applied to the drive lines 30*a* and 31*a* such that the transistors 30 and 31 are switched on.

With a controller thus structured according to this invention, the window at each seat can be manually opened and closed and an automatic operation is also made possible from specified seats (the driver seat and the passenger seat according to this example). From one particular seat (the driver seat according to this example), furthermore, the windows at the other seats (the passenger and back seats according to this example) cal also be opened and closed through communications between the units through the multiplex communication bus line 15.

If the automobile has an accident and the main switch unit 11 at the driver seat becomes goes under water, the detector transistor 36 of its detector circuit 25 is switched on and the constant power voltage comes to be applied to the drive lines 30*a,* 31*a* and 32*a* such that the transistors 30, 31, 32 are forcibly switched on, independent of any control from the control circuit 24. As a result, both relays 28 and 29 are switched on and prevent the motor 1 from operating and the driver seat window from opening or closing in any unwanted manner. Since the communication transistor 32 is switched on, the voltage of the multiplex communication bus line 15 is fixed to the lower level in this example, it becomes impossible to make communications therethrough. As a result, even if an unwanted operation signal happens to be outputted from the main switch unit 11 under water, say, due to a current leakage, no operation signal is erroneously transmitted from the main switch unit 11 to any of the sub-switch units 12, 13 and 14. In summary, the windows at the passenger seat and the back seats are dependably prevented from opening or closing in an unwanted manner due to erroneous transmission of a signal between the control units although no separate lines for signal transmission are provided.

Since the relay switch 27 is provided according to this example, it is dependably made possible, even if the main switch unit 11 has sunk under water, to operate switch DRDN to selectively activate the window-opening relay 28 and to thereby rotate the motor 1 in the positive direction and to open the window. It is because the relay switch 27 is activated in correlation with operating switch DRDN such that the terminals on both sides of the coil 29*a* of the window-closing relay 29 are shorted through the C terminal and the NO terminal of the relay switch 27 and hence that the widow-closing relay 29 does not fail to be switched off, leaving only the window-opening relay 28 switched on.

If any of the sub-switch units 12, 13 and 14 has sunk under water, the constant source voltage is applied to the driver lines 30*a* and 31*a* by the function of the detector circuit 45 and the transistors 30 and 31 are switched on. As a result, both relays 28 and 29 are switched on such that the motor 2 is prevented from operating in any unwanted manner. If switch DOWN is operated, the relay switch 27 is activated such that the window-opening relay 28 alone is switched on and the motor 2 is rotated in the positive direction to dependably open the window at the passenger seat or a back seat.

In summary, all of the window-controlling motors are prevented from moving in any unwanted direction and if a knob is operated from any of the seats, the corresponding motor is dependably rotated in the positive direction and the corresponding window can be dependably opened.

Figure 4:
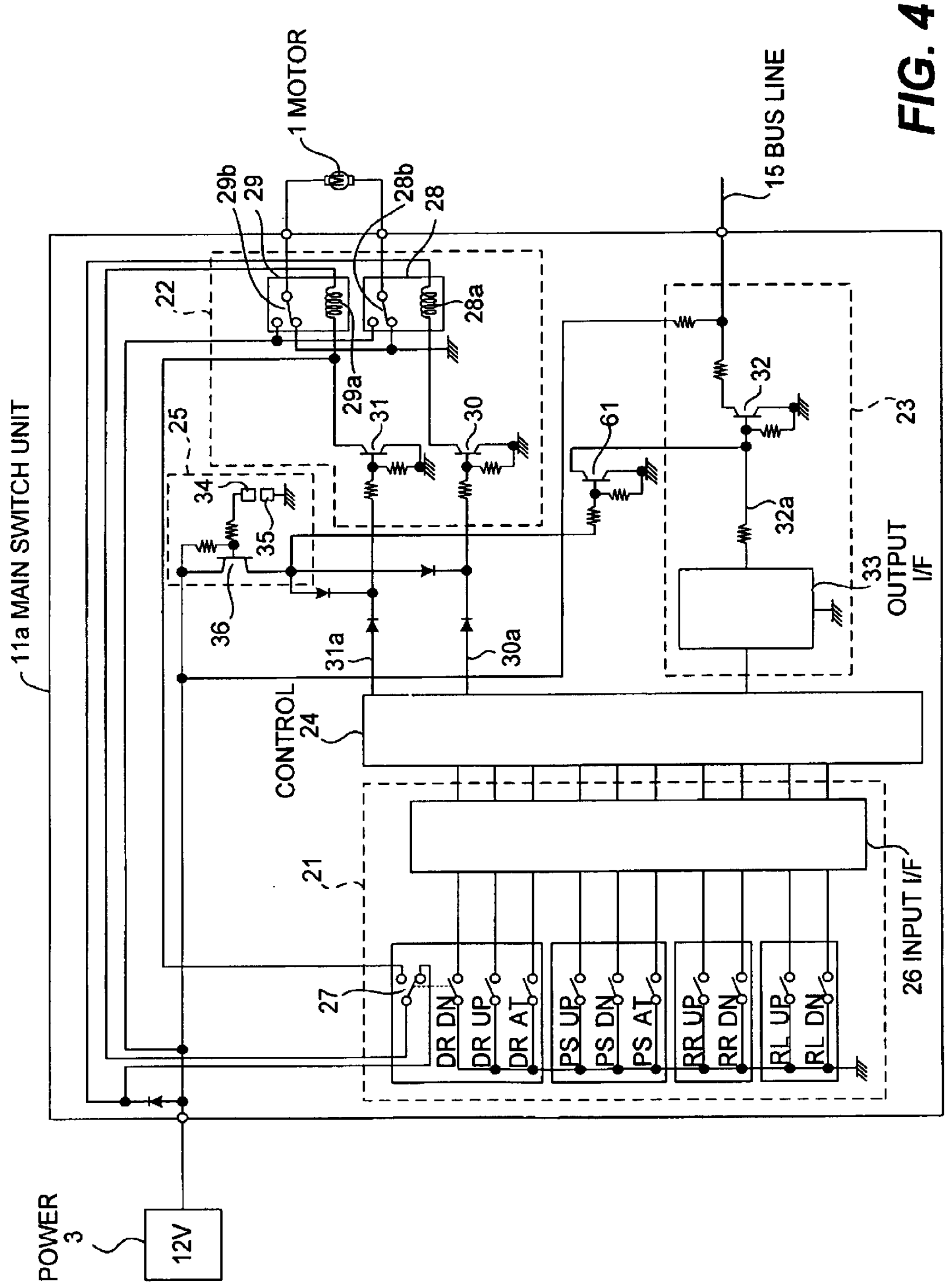
FIG. 4 is a circuit diagram of a main switch unit according to a second embodiment of the invention.

Another controller according to a second embodiment of the invention is described with reference to FIG. 4 which shows a circuit diagram of its main switch unit 11*a*. The main switch unit 11*a* according to the second embodiment of the invention is characterized as including a voltage-inverting transistor 61 serving to invert the voltage applied to the driver line 32*a* when in an underwater condition. In other respect, the second embodiment is the same as the first embodiment.

The voltage-inverting transistor 61 is switched on if a driving voltage is applied through the detector transistor 36 and connects the drive line 32*a* to the ground line, thereby applying the ground voltage to the drive line 32*a*. In other words, if the detector transistor 36 of the detector circuit 25 is switched on under an underwater condition, the ground voltage is applied to the drive line 32*a* and the communication transistor 32 remains in the switched-off condition. In this example, the aforementioned detector function and communication preventing function may be considered to be functions of the detector circuit 25 and the voltage-inverting transistor 61.

The second embodiment of the invention has the same merits as the first embodiment of the invention. Since the communication transistor 32 becomes switched off in an underwater condition, the voltage of the multiplex communication bus line 15 becomes fixed at a high level such that it becomes impossible to make communications through the bus line.

Figure 5:
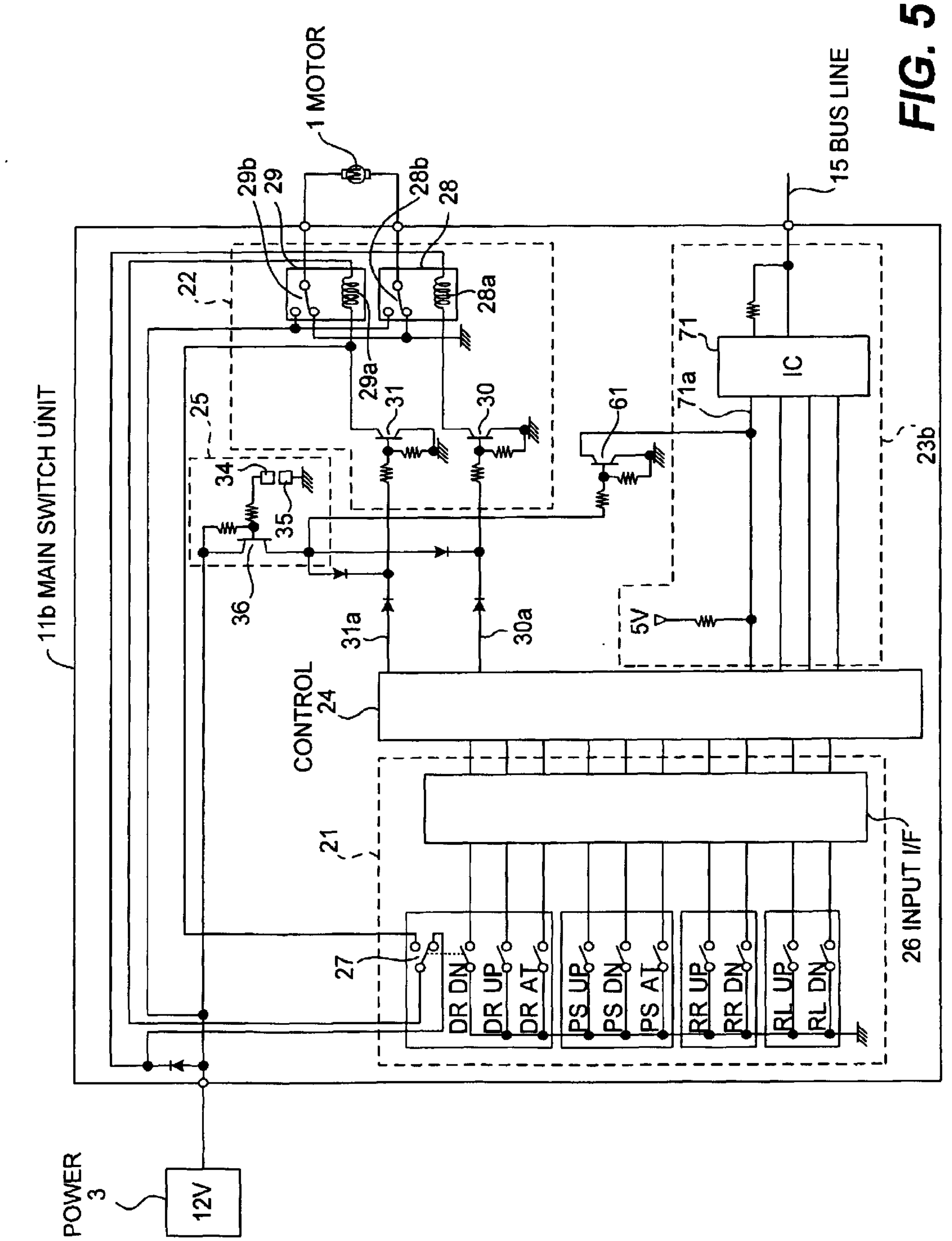
FIG. 5 is a circuit diagram of a main switch unit according to a third embodiment of the invention.
Figure 6:
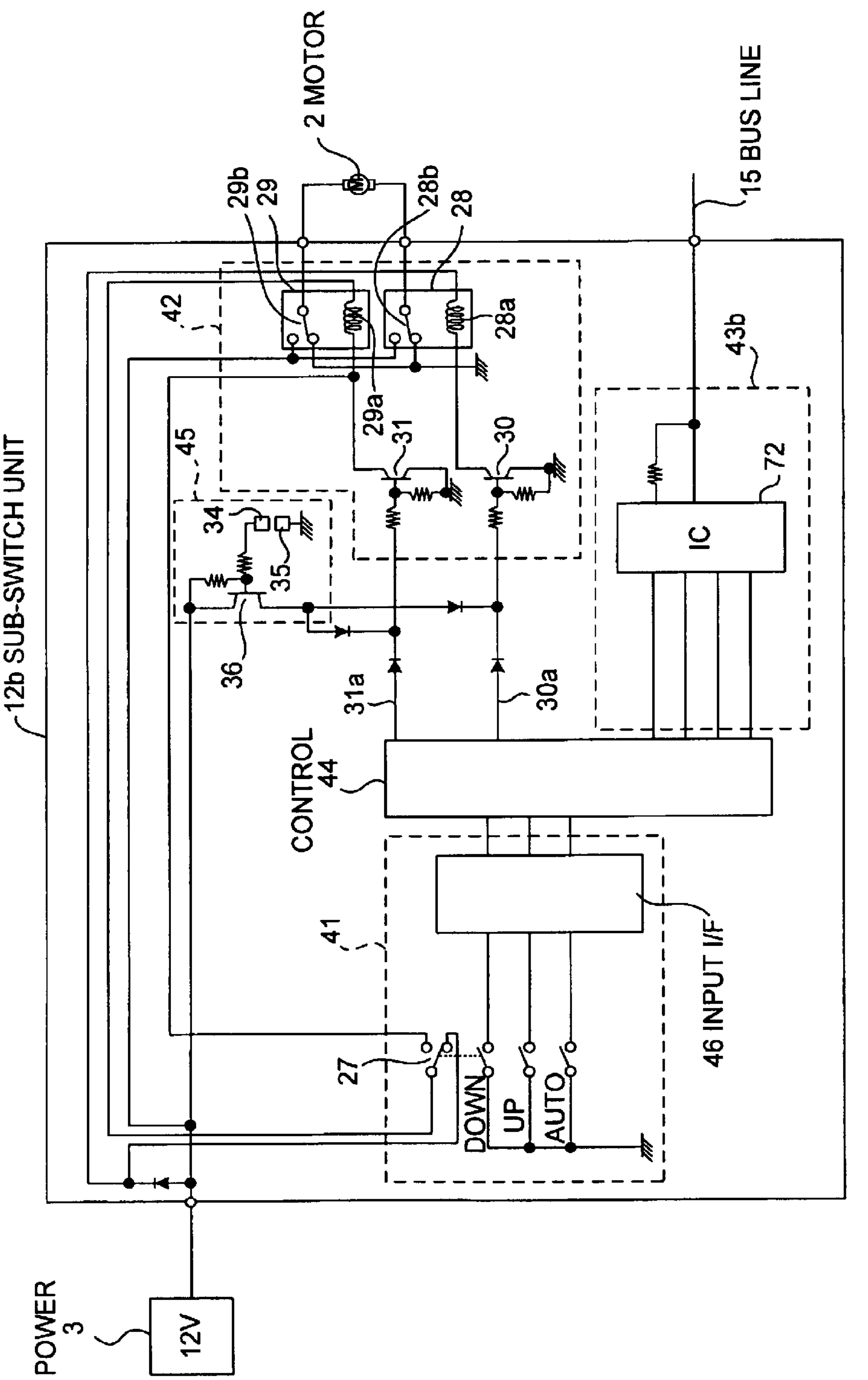
FIG. 6 is a circuit diagram of a sub-switch unit according to a third embodiment of the invention.

Still another controller according to a third embodiment of the invention is described next with reference to FIGS. 5 and 6 which show the circuit structure of its main switch unit 11*b* and sub-switch unit 12*b*. As shown in FIGS. 5 and 6, the third embodiment is characterized wherein the main switch unit 11*b* and the sub-switch unit 12*b* each have a multiplex communication interface 23*b* or 43*b* comprising an IC 71 or 72 for communication. In other aspect, the third embodiment is the same as the second embodiment except that communication is made impossible by applying a ground voltage to the transmission port 71*a* of the communication IC 71 by an operation of the voltage-inverting transistor 61.

This embodiment also has the same merits as the first embodiment.

Although the invention has been described above by way of only a limited number of embodiments, these embodiments are not intended to limit the scope of the invention. Many modifications and variations are possible within the scope of the invention. Although embodiments allowing automatic window operations only from the driver seat and the passenger seat were presented, for example, this function may be provided also to the back seats, only to the driver seat or none of the seats at all. Similarly, the controller may be structured such that the function of controlling windows at other seats is provided also to the passenger and back seats in addition to the driver seat.

Although embodiments intended to dependably open the winders with a relay switch (such as shown at 27) provided only to the window-closing relay 29 were presented, a relay switch which will be operated together with switch DRUP, for example, may be provided to the window-opening relay 28 such that the windows can be dependably closed in an underwater condition. When an automobile sinks into water, however, the required dependability is usually to open the windows, rather than to close them. From this point view, therefore, this variation may be relatively less valuable. If the aim is simply to prevent the windows from opening and closing incorrectly, on the other hand, the relay switch 27 may be dispensed with.

What is claimed is:

1. A controller comprising:

a plurality of control units each set at a different position of a vehicle for controlling opening and closing of a corresponding one of mobile structures; and a communication line having an interface and connecting said control units for allowing communications among said control units;

wherein a specified one of said control units is adapted to transmit an operating signal, in response to a switch operation thereon, to another of said control units through said communication line to make the mobile structure corresponding to said another control unit operable; and wherein at least said specified control unit has a detector function of detecting an underwater condition and a communication preventing function of applying a constant voltage to said interface of said communication line and thereby preventing communications through said communication line if an underwater condition is detected by said detector function.

2. The controller of claim 1 wherein said constant voltage is higher than the ground voltage.

3. The controller of claim 1 wherein said constant voltage is the ground voltage.

4. The controller of claim 1 wherein said interface comprises a switching element for being switched on and off and thereby causing selectively a higher voltage and a lower voltage to be applied to said communication line and wherein said specified control unit is adapted to prevent communications through said communication line by applying said constant voltage to a drive line to said switching element and thereby keeping said switching element switched on or off.

5. The controller of claim 2 herein said interface comprises a switching element for being switched on and off and thereby causing selectively a higher voltage and a lower voltage to be applied to said communication line and wherein said specified control unit is adapted to prevent communications through said communication line by applying said constant voltage to a drive line to said switching element and thereby keeping said switching element switched on or off.

6. The controller of claim 3 wherein said interface comprises a switching element for being switched on and off and thereby causing selectively a higher voltage and a lower voltage to be applied to said communication line and wherein said specified control unit is adapted to prevent communications through said communication line by applying said constant voltage to a drive line to said switching element and thereby keeping said switching element switched on or off.

7. The controller of claim 1 wherein said interface comprises a communication IC having a transmission port and wherein said specified control unit is adapted to prevent communications through said communication line by applying said constant voltage to said transmission port.

8. The controller of claim 2 wherein said interface comprises a communication IC having a transmission port and wherein said specified control unit is adapted to prevent communications through said communication line by applying said constant voltage to said transmission port.

9. The controller of claim 3 wherein said interface comprises a communication IC having a transmission port and wherein said specified control unit is adapted to prevent communications through said communication line by applying said constant voltage to said transmission port.

* * * * *

UNITED STATES PATENT AND TRADEMARK OFFICE

CERTIFICATE OF CORRECTION

PATENT NO. : 6,975,084 B2
DATED : December 13, 2005
INVENTOR(S) : Sugiura et al.

It is certified that error appears in the above-identified patent and that said Letters Patent is hereby corrected as shown below:

<u>Title page,</u>
Item [75], Inventors, change "Toshihiko Sugiura" to -- Tokihiko Sugiura --.

Signed and Sealed this

Twenty-first Day of March, 2006

JON W. DUDAS
*Director of the United States Patent and Trademark Office*